United States Patent
Yoshida (10) Patent No.: US 11,577,994 B2
(45) Date of Patent: Feb. 14, 2023

(54) OPTICAL FIBER MANUFACTURING METHOD AND MANUFACTURING DEVICE

(71) Applicant: SUMITOMO ELECTRIC INDUSTRIES, LTD., Osaka (JP)

(72) Inventor: Nao Yoshida, Utsunomiya (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/982,499

(22) PCT Filed: Mar. 20, 2019

(86) PCT No.: PCT/JP2019/011866
§ 371 (c)(1),
(2) Date: Sep. 18, 2020

(87) PCT Pub. No.: WO2019/182060
PCT Pub. Date: Sep. 26, 2019

(65) Prior Publication Data
US 2021/0017073 A1    Jan. 21, 2021

(30) Foreign Application Priority Data

Mar. 22, 2018  (JP) .............................. JP2018-055124

(51) Int. Cl.
C03C 25/10       (2018.01)
C03C 25/1065    (2018.01)
C03C 25/12       (2006.01)

(52) U.S. Cl.
CPC .......... *C03C 25/1065* (2013.01); *C03C 25/12* (2013.01)

(58) Field of Classification Search
CPC ............................ C03C 25/1065; C03C 25/12
See application file for complete search history.

(56) References Cited

U.S. PATENT DOCUMENTS 3,822,095 A * 7/1974 Hirschfeld ......... G01N 15/1475
                                                                 356/39
4,374,161 A * 2/1983 Geyling ................. C03C 25/18
                                                                 427/160

(Continued)

FOREIGN PATENT DOCUMENTS

CN     A-103068552 A     4/2013
JP     H06-321583 A     11/1994
(Continued)

*Primary Examiner* — Peter Radkowski
(74) *Attorney, Agent, or Firm* — Faegre Drinker Biddle & Reath LLP (57) ABSTRACT

The present invention is a method for manufacturing an optical fiber which includes a resin coating step in which a resin is supplied to a resin coating section via piping, and a glass fiber is passed through the resin coating section such that the resin is coated on the outer circumference of the glass fiber. In the resin coating step, the temperature of the resin inside the piping is measured, and a heating unit provided on the outer circumference of at least some of the piping is controlled such that the temperature of the resin inside the piping reaches a set target temperature; and a viscometer is disposed in between the resin coating section and the piping on which the heating unit is provided, and the set value of the target temperature is adjusted such that the viscosity of the resin measured by the viscometer reaches a target viscosity.

6 Claims, 2 Drawing Sheets

(56) References Cited

U.S. PATENT DOCUMENTS

| | | | | |
|---|---|---|---|---|
| 4,420,983 A * | 12/1983 | Langdon | G01F 1/66 | 73/32 A |
| 4,533,570 A * | 8/1985 | Iyengar | C03C 25/18 | 118/405 |
| 4,622,242 A * | 11/1986 | Mackay | C03C 25/18 | 427/163.2 |
| 4,644,898 A * | 2/1987 | Jochem | H01B 13/14 | 118/405 |
| 4,704,307 A * | 11/1987 | Jochem | C03C 25/18 | 427/117 |
| 4,765,271 A * | 8/1988 | Jochem | B05C 3/12 | 118/405 |
| 4,851,165 A * | 7/1989 | Rennell, Jr. | C03C 25/18 | 264/1.29 |
| 4,869,199 A * | 9/1989 | Zaman | B05C 3/12 | 118/125 |
| 5,363,691 A * | 11/1994 | Gallagher | G01N 9/002 | 73/30.01 |
| 5,366,527 A * | 11/1994 | Amos | C03C 25/12 | 65/382 |
| 5,766,357 A * | 6/1998 | Packer | B29B 15/122 | 118/307 |
| 5,885,652 A * | 3/1999 | Abbott, III | C03C 25/18 | 427/163.2 |
| 5,938,986 A * | 8/1999 | Nakamura | G02B 6/02038 | 264/1.24 |
| 5,948,684 A * | 9/1999 | Weigl | G01N 30/0005 | 436/52 |
| 6,044,665 A * | 4/2000 | Lysson | C03C 25/18 | 65/430 |
| 6,072,930 A * | 6/2000 | Kornreich | C03B 37/01211 | 385/123 |
| 6,171,865 B1 * | 1/2001 | Weigl | B01F 5/0403 | 422/81 |
| 6,189,343 B1 * | 2/2001 | Cocchini | C03C 25/18 | 118/125 |
| 6,252,129 B1 * | 6/2001 | Coffee | A61F 13/00085 | 239/3 |
| 6,327,876 B1 * | 12/2001 | Cocchini | C03C 25/18 | 427/163.2 |
| 6,527,986 B2 * | 3/2003 | Blyler, Jr. | B29D 11/00663 | 264/1.29 |
| 6,537,377 B1 * | 3/2003 | Piffaretti | C03C 25/18 | 118/125 |
| 6,561,010 B2 * | 5/2003 | Wilson | G01N 33/2888 | 73/54.04 |
| 6,576,058 B2 * | 6/2003 | Oishi | C03C 25/1065 | 118/125 |
| 6,582,963 B1 * | 6/2003 | Weigl | B01F 5/0403 | 422/81 |
| 6,630,209 B2 * | 10/2003 | Lynch | C03C 25/1065 | 427/163.2 |
| 6,720,393 B1 * | 4/2004 | George | C08F 10/00 | 422/109 |
| 6,810,718 B2 * | 11/2004 | Wilson | G01N 33/2888 | 73/54.01 |
| 6,907,785 B1 * | 6/2005 | Gallagher | G01L 1/183 | 73/514.29 |
| 7,655,470 B2 * | 2/2010 | Ismagilov | B01L 3/502784 | 436/55 |
| 8,079,250 B2 * | 12/2011 | Sebok | G01N 11/08 | 73/54.43 |
| 8,236,213 B2 * | 8/2012 | Kasahara | B01J 19/1862 | 264/83 |
| 8,588,573 B2 * | 11/2013 | Okada | C03C 25/12 | 385/141 |
| 8,661,856 B2 * | 3/2014 | Okada | C03B 37/02718 | 65/381 |
| 9,128,245 B2 * | 9/2015 | Fabian | G02B 1/12 | |
| 9,162,406 B2 * | 10/2015 | Neavin | B32B 27/08 | |
| 9,244,221 B1 * | 1/2016 | Ocampo | G02B 1/048 | |
| 9,563,013 B2 * | 2/2017 | Ocampo | G02B 1/048 | |
| 9,630,356 B2 * | 4/2017 | Neavin | B29C 48/21 | |
| 9,833,956 B2 * | 12/2017 | Neavin | B29C 48/70 | |
| 10,036,108 B2 * | 7/2018 | Moore | G02B 6/4402 | |
| 10,041,870 B2 * | 8/2018 | Gao | G01N 9/32 | |
| 10,625,479 B2 * | 4/2020 | Neavin | B29D 11/00788 | |
| 2001/0003148 A1 * | 6/2001 | Coffee | D01F 1/10 | 602/42 |
| 2001/0006703 A1 * | 7/2001 | Lynch | C03C 25/1065 | 427/163.2 |
| 2001/0013247 A1 * | 8/2001 | Wilson | G01N 33/2888 | 73/54.01 |
| 2002/0105102 A1 * | 8/2002 | Blyler, Jr. | B29C 48/30 | 264/1.29 |
| 2002/0179008 A1 * | 12/2002 | Oishi | C03C 25/12 | 118/412 |
| 2003/0101801 A1 * | 6/2003 | Wilson | G01N 33/2888 | 73/54.01 |
| 2008/0287609 A1 * | 11/2008 | Kasahara | C08F 214/26 | 525/356 |
| 2009/0145168 A1 * | 6/2009 | Orita | C03C 25/18 | 65/384 |
| 2009/0241603 A1 * | 10/2009 | Song | C03C 25/18 | 65/435 |
| 2009/0291199 A1 * | 11/2009 | Chludzinski | C03C 25/12 | 427/9 |
| 2010/0005866 A1 * | 1/2010 | Sebok | G01F 1/7086 | 73/54.43 |
| 2010/0240791 A1 | 9/2010 | Sugiyama et al. | | |
| 2011/0239709 A1 * | 10/2011 | Okada | C03C 25/12 | 65/381 |
| 2011/0272832 A1 * | 11/2011 | Neavin | B29C 48/71 | 264/1.7 |
| 2011/0272849 A1 * | 11/2011 | Neavin | B29C 48/70 | 264/173.11 |
| 2011/0274404 A1 * | 11/2011 | Okada | C03B 37/02718 | 385/141 |
| 2013/0042964 A1 * | 2/2013 | Neavin | B32B 27/06 | 156/182 |
| 2013/0122194 A1 * | 5/2013 | Ui | C03C 25/18 | 427/163.2 |
| 2013/0180330 A1 * | 7/2013 | Gao | G01N 9/32 | 73/32 A |
| 2014/0341521 A1 * | 11/2014 | Fabian | G02B 1/12 | 385/128 |
| 2015/0147467 A1 * | 5/2015 | Moore | G02B 6/036 | 427/163.2 |
| 2016/0083293 A1 * | 3/2016 | Okada | B05C 3/125 | 427/356 |
| 2016/0097897 A1 * | 4/2016 | Ocampo | C09D 133/08 | 524/500 |
| 2016/0313292 A1 * | 10/2016 | Desai | G01N 33/28 | |
| 2017/0225380 A1 * | 8/2017 | Neavin | B29C 48/21 | |
| 2018/0086014 A1 * | 3/2018 | Neavin | B29C 48/495 | |

FOREIGN PATENT DOCUMENTS

| | | |
|---|---|---|
| JP | H08-119681 A | 5/1996 |
| JP | 2009-227522 A | 10/2009 |
| JP | 2018-048050 A | 3/2018 |
| JP | 2018-058725 A | 4/2018 |
| WO | WO-2009/096342 A1 | 8/2009 |

* cited by examiner

OPTICAL FIBER MANUFACTURING METHOD AND MANUFACTURING DEVICE

TECHNICAL FIELD

The present disclosure relates to a method for manufacturing an optical fiber and an apparatus thereof.

This application is based upon and claims the benefit of priority from Japanese Patent Application No. 2018-055124, filed Mar. 22, 2018, the entire contents of which are incorporated herein by reference.

BACKGROUND ART

In Patent Literature 1, it is described that a pressure gauge is provided at an upstream end and a downstream end of a resin supply pipe from a resin supply tank to a coating device to monitor the pressure. Described is a method for manufacturing an optical fiber in which an output of the pressure gauge is inputted to an arithmetic device, a command is issued to a temperature controller of a resin heating device so that the differential pressure becomes equal to a preset reference differential pressure, and a temperature of the heating device increases or decreases so that a viscosity of resin becomes constant at a predetermined value. It is described that the coating device is provided with a resin viscosity detecting unit. It is described that a viscosity measured by the resin viscosity detecting unit is compared with a preset reference viscosity, and the temperature of the resin heating device is controlled based upon the comparison therebetween.

CITATION LIST

Patent Literature

Patent Literature 1: JP-A-H08-119681

SUMMARY OF INVENTION

A method for manufacturing an optical fiber according to one aspect of the present disclosure, the method including: a resin coating step, including: supplying resin to a resin coating portion via a pipe; causing a glass fiber to pass through the resin coating portion; and coating an outer periphery of the glass fiber with the resin, in which in the resin coating step, the method includes: controlling a heating portion provided around an outer periphery of at least a part of the pipe so that a resin temperature in the pipe becomes a set target temperature with measuring the resin temperature in the pipe; and adjusting a set value of the target temperature so that a resin viscosity measured by a viscometer becomes a target viscosity, the viscometer being disposed between the resin coating portion and the pipe.

An apparatus of manufacturing an optical fiber according to one aspect of the present disclosure, including: a resin coating portion coating an outer periphery of a glass fiber with a resin by supplying the resin via a pipe and passing the glass fiber through the resin coating portion; a heating portion heating an outer periphery of at least a part of the pipe; a temperature measuring portion measuring a resin temperature in the pipe; a control portion configured to control the heating portion so that the resin temperature in the pipe becomes a target temperature; a viscometer disposed between the resin coating portion and the pipe; and an adjusting portion configured to adjust a set value of the target temperature so that a resin viscosity measured by the viscometer becomes a target viscosity.

DESCRIPTION OF EMBODIMENTS

Technical Problem

In the manufacturing of an optical fiber, in order to prevent fluctuation of a coating diameter of the optical fiber and uneven thickness thereof, it is required to set a resin temperature in a die (a resin coating portion) to a constant target temperature at which the coating diameter falls within a standard range.

Therefore, for example, in the method described in Patent Literature 1, a temperature of a resin heating device is controlled so that a differential pressure measured by a pressure gauge provided at an upstream end of a resin supply pipe and a downstream end thereof becomes equal to a reference differential pressure, or based upon a comparison between a viscosity measured by a resin viscosity detecting unit provided in a coating device and a reference viscosity.

In the control of the heating device by the differential pressure of the resin supply pipe or the viscosity of the resin, a time lag with respect to fluctuation of the resin temperature during drawing at the time of manufacturing the optical fiber becomes large, so that it is difficult to control the resin temperature to always maintain the target temperature during drawing. For this reason, the resin viscosity may fluctuate due to the temperature fluctuation of the resin applied during drawing, thereby causing a possibility that the fluctuation of the coating diameter of the optical fiber and the uneven thickness thereof may occur.

Therefore, an object of the present disclosure is to provide a method for manufacturing an optical fiber and an apparatus thereof in which fluctuation of a viscosity of resin applied during drawing is suppressed such that it is possible to prevent fluctuation of a coating diameter of the optical fiber and uneven thickness thereof from occurring.

Advantageous Effects of the Present Disclosure

According to a method for manufacturing an optical fiber and an apparatus thereof according to the present disclosure, fluctuation of a viscosity of resin applied during drawing is suppressed such that it is possible to prevent fluctuation of a coating diameter of the optical fiber and uneven thickness thereof from occurring.

Description of Embodiments of the Present Disclosure

First, an embodiment of the present disclosure will be listed and described.

A method for manufacturing an optical fiber according to one aspect of the present disclosure is:

(1) A method for manufacturing an optical fiber, the method including: a resin coating step, including: supplying resin to a resin coating portion via a pipe; causing a glass fiber to pass through the resin coating portion; and coating an outer periphery of the glass fiber with the resin, in which in the resin coating step, the method includes: controlling a heating portion provided around an outer periphery of at least a part of the pipe so that a resin temperature in the pipe becomes a set target temperature with measuring the resin temperature in the pipe; and adjusting a set value of the target temperature so that a resin viscosity measured by a viscometer becomes a target viscosity, the viscometer being disposed between the resin coating portion and the pipe.

According to the method, since the resin temperature in the pipe is measured and the heating portion is controlled so that the resin temperature therein becomes the target temperature, the resin temperature can be controlled with good followability with respect to fluctuation of the resin temperature. For example, even though the same type of resin is used, a variation in a viscosity-temperature characteristic may occur for each production lot. Therefore, even though the resin temperature is controlled to become a preset target temperature, an actual resin viscosity may deviate from a target viscosity. For this reason, the resin viscosity between the resin coating portion and the pipe is measured during a drawing operation and the set value of the target temperature is adjusted, whereby the viscosity of the resin applied during drawing can be close to the target viscosity. Accordingly, it is possible to prevent the viscosity fluctuation of the resin applied during drawing, and to prevent fluctuation of a coating diameter of the optical fiber and uneven thickness thereof from occurring.

(2) It may be possible to keep the resin coating portion at a predetermined temperature by allowing a fluid having a predetermined temperature set value to flow around a periphery of the resin coating portion and to adjust the temperature set value of the fluid based upon the resin viscosity measured by the viscometer.

According to the method, it is possible to perform adjustment for keeping the resin temperature immediately before being applied to the glass fiber at the target temperature based upon the measured resin viscosity. Accordingly, it is possible to more surely prevent the fluctuation of the coating diameter of the optical fiber and the uneven thickness thereof from occurring.

(3) It may be possible that the resin coating portion is configured by integrally assembling a first coating portion coating an outside of the glass fiber with first resin and a second coating portion coating an outside of the first resin with second resin, and in which in the resin coating step, the method further includes: measuring a resin temperature in a first pipe supplying the first resin to the first coating portion; measuring a resin temperature in a second pipe supplying the second resin to the second coating portion; controlling each heating portion so that the resin temperature in the first pipe and the resin temperature in the second pipe become the set target temperature; adjusting a set value of the target temperature in the first pipe so that a viscosity of the first resin measured by a first viscometer becomes a first target viscosity, the first viscometer being disposed between the first coating portion and the first pipe; and adjusting a set value of the target temperature in the second pipe so that a viscosity of the second resin measured by a second viscometer becomes a second target viscosity, the second viscometer being disposed between the second coating portion and the second pipe.

According to the method, when the glass fiber is coated with two layers of resin by the resin coating portion in which the first resin coating portion and the second resin coating portion are integrally assembled, and even when a temperature characteristic with respect to the viscosity is different between the first resin and the second resin, it is possible to reduce a difference in viscosities between the two resins applied during drawing. When the difference in viscosities between the two resins to be applied is large, the fluctuation of the coating diameter of the optical fiber and the uneven thickness thereof may significantly occur, but since the difference in viscosities between the two resins can be reduced, it is possible to prevent the fluctuation of the coating diameter of the optical fiber and the uneven thickness thereof from occurring.

(4) It may be possible that the resin coating step includes: causing the first target viscosity and the second target viscosity to match each other; and adjusting the set value of the target temperature in the first pipe and the set value of the target temperature in the second pipe.

According to the method, the difference in viscosities between the two resins applied during drawing can be more surely reduced. Accordingly, it is possible to more surely reduce a defect rate caused by the occurrence of the fluctuation of the coating diameter of the optical fiber and the uneven thickness thereof.

(5) It may be possible that the first viscometer and the second viscometer use a vibration type viscometer.

According to the method, since a rod-shaped vibration sensor inserted into the pipe can measure the viscosity by contacting the fluid, the vibration type viscometer is suitable for measuring the viscosity of the fluid. The vibration type viscometer has a feature of obtaining a quick response and performing continuous measurement.

Furthermore, an apparatus of manufacturing an optical fiber according to one aspect of the present disclosure is:

(6) An apparatus of manufacturing an optical fiber, including: a resin coating portion coating an outer periphery of a glass fiber with a resin by supplying the resin via a pipe and passing the glass fiber through the resin coating portion; a heating portion heating an outer periphery of at least a part of the pipe; a temperature measuring portion measuring a resin temperature in the pipe; a control portion configured to control the heating portion so that the resin temperature in the pipe becomes a target temperature; a viscometer disposed between the resin coating portion and the pipe; and an adjusting portion configured to adjust a set value of the target temperature so that a resin viscosity measured by the viscometer becomes a target viscosity.

According to the configuration, the control portion measures the resin temperature in the pipe and controls the heating portion so that the resin temperature therein becomes the target temperature, whereby the resin temperature can be controlled with good followability with respect to fluctuation of the resin temperature. For example, even though the same type of resin is used, a variation in a viscosity-temperature characteristic may occur for each production lot. Therefore, even though the resin temperature is controlled to become a preset target temperature, an actual resin viscosity may deviate from a target viscosity. For this reason, the resin viscosity between the resin coating portion and the pipe is measured by the viscometer during a drawing operation, and the set value of the target temperature is adjusted by the adjusting portion, whereby the viscosity of the resin applied during drawing can be close to the target viscosity. Accordingly, it is possible to prevent the viscosity fluctuation of the resin applied during drawing, and to prevent fluctuation of a coating diameter of the optical fiber and uneven thickness thereof from occurring.

(7) It may be possible that the apparatus of manufacturing the optical fiber further including: a temperature adjusting portion configured to keep a temperature of the resin coating portion at a predetermined temperature by allowing a fluid having a predetermined temperature set value to flow around a periphery of the resin coating portion, in which the temperature adjusting portion is further configured to adjust the temperature set value of the fluid based on the resin viscosity measured by the viscometer.

According to the configuration, the temperature adjusting portion can perform adjustment for keeping the resin temperature immediately before being applied to the glass fiber at the target temperature based upon the measured resin viscosity. Accordingly, it is possible to more surely prevent the fluctuation of the coating diameter of the optical fiber and the uneven thickness thereof from occurring.

Details of Embodiments of the Present Disclosure

Hereinafter, specific examples of a method for manufacturing an optical fiber and an apparatus thereof according to an embodiment of the present disclosure will be described with reference to the drawings.

The present invention is not limited to these examples, but is indicated by the scope of claims, and is intended to include meanings equivalent to the scope of claims and all the modifications within the scope.

Figure 1:
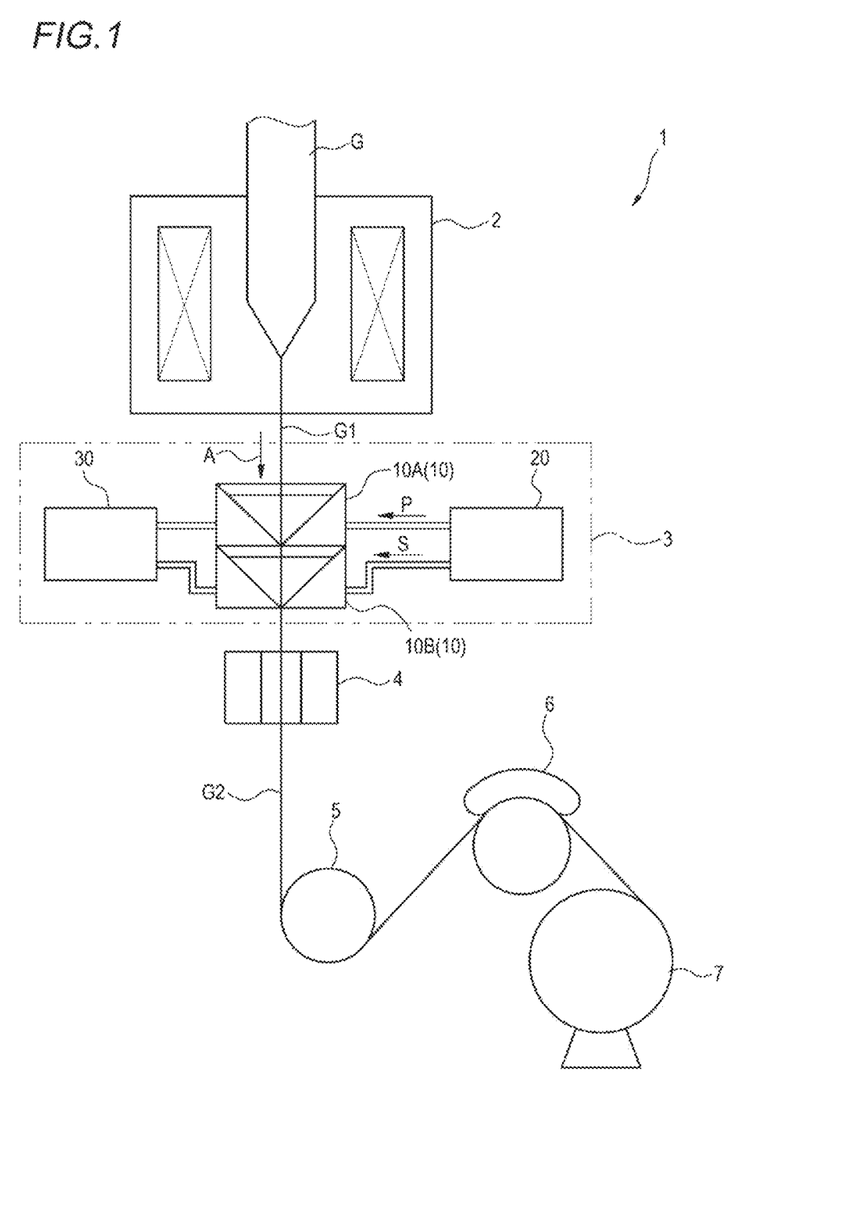
FIG. 1 is a diagram illustrating an apparatus of manufacturing an optical fiber according to an embodiment of the present disclosure.

FIG. 1 is a schematic configuration diagram illustrating an example of an apparatus of manufacturing an optical fiber according to an embodiment of the present disclosure.

As illustrated in FIG. 1, an apparatus of manufacturing an optical fiber 1 includes a drawing furnace 2, a resin coating device for the optical fiber 3, a resin curing device 4, a guide roller 5, a take-up portion 6, and a winding-up drum 7.

By heating an optical fiber preform G in the drawing furnace 2, a lower end portion of the optical fiber preform G is fused and drawn. A glass fiber G1 formed by drawing passes through the resin coating device for the optical fiber 3 provided downstream of the drawing furnace 2 in a traveling direction of the glass fiber G1 (a direction of an arrow A in FIG. 1).

The resin coating device for the optical fiber 3 includes: a resin coating portion 10 that coats the glass fiber G1 with resin; a resin supply device 20 that supplies the resin to the resin coating portion 10; and a fluid circulating device 30 that circulates a fluid around a periphery of the resin coating portion 10 and keeps a resin temperature at a predetermined temperature.

The resin coating portion 10 is configured by integrally assembling a first coating portion 10A and a second coating portion 10B. In the traveling direction of the glass fiber G1, the first coating portion 10A is disposed on the upstream side and the second coating portion 10B is disposed on the downstream side. The first coating portion 10A applies primary resin (first resin) P supplied from the resin supply device 20. The second coating portion 10B applies secondary resin (second resin) S supplied from the resin supply device 20. A detailed configuration of the resin coating device for the optical fiber 3 will be described later with reference to FIG. 2.

By allowing the glass fiber G1 to pass through the resin coating portion 10 of the resin coating device for the optical fiber 3, an outer periphery of the glass fiber G1 is collectively coated with two layers of resin (the primary resin P and the secondary resin S).

The glass fiber G1 coated with the resin passes through the resin curing device 4 (for example, an ultraviolet irradiation device) provided downstream of the resin coating device for the optical fiber 3, whereby the resin is cured to form an optical fiber G2. The optical fiber G2 is wound around the winding-up drum 7 via the guide roller 5 and the take-up portion 6.

Meanwhile, the resin applied to the glass fiber G1 has a characteristic that a resin viscosity decreases as a resin temperature increases. Therefore, as the resin temperature increases, the resin viscosity decreases, such that a coating diameter of the optical fiber G2 becomes thinner. The viscosity may fluctuate due to fluctuation of the resin temperature, and uneven thickness may be generated in the coating. Therefore, it is required to keep the resin temperature in the resin coating portion 10 during manufacturing of the optical fiber (during drawing) at a constant target temperature at which the coating diameter falls within a standard range.

In order to keep the resin temperature in the resin coating portion 10 constant, it can be ideally considered to directly measure the resin temperature in the resin coating portion 10, and to control the resin temperature based upon the measured result. However, when a temperature measuring device such as a thermocouple is placed inside the resin coating portion 10, a flow of the resin in the resin coating portion 10 is disturbed, which may affect a resin coating state of the glass fiber G1 and may cause deterioration in quality of the optical fiber G2 to be manufactured. For this reason, it is difficult to measure the resin temperature in the resin coating portion 10.

Therefore, for example, a method for keeping the resin temperature in the resin coating portion 10 constant by controlling the temperature of the resin to be supplied from the resin supply device 20 to the resin coating portion 10 can be considered. In the apparatus of manufacturing the optical fiber 1, the temperature and viscosity of the resin to be supplied to the resin coating portion 10 are measured, and the measured resin temperature and resin viscosity are controlled by causing the measured resin temperature and resin viscosity to correspond to each other, whereby it is possible to prevent the fluctuation of the temperature and viscosity of the resin in the resin coating portion 10.

Next, the configuration of the resin coating device for the optical fiber 3 will be described in detail with reference to FIG. 2.

Figure 2:
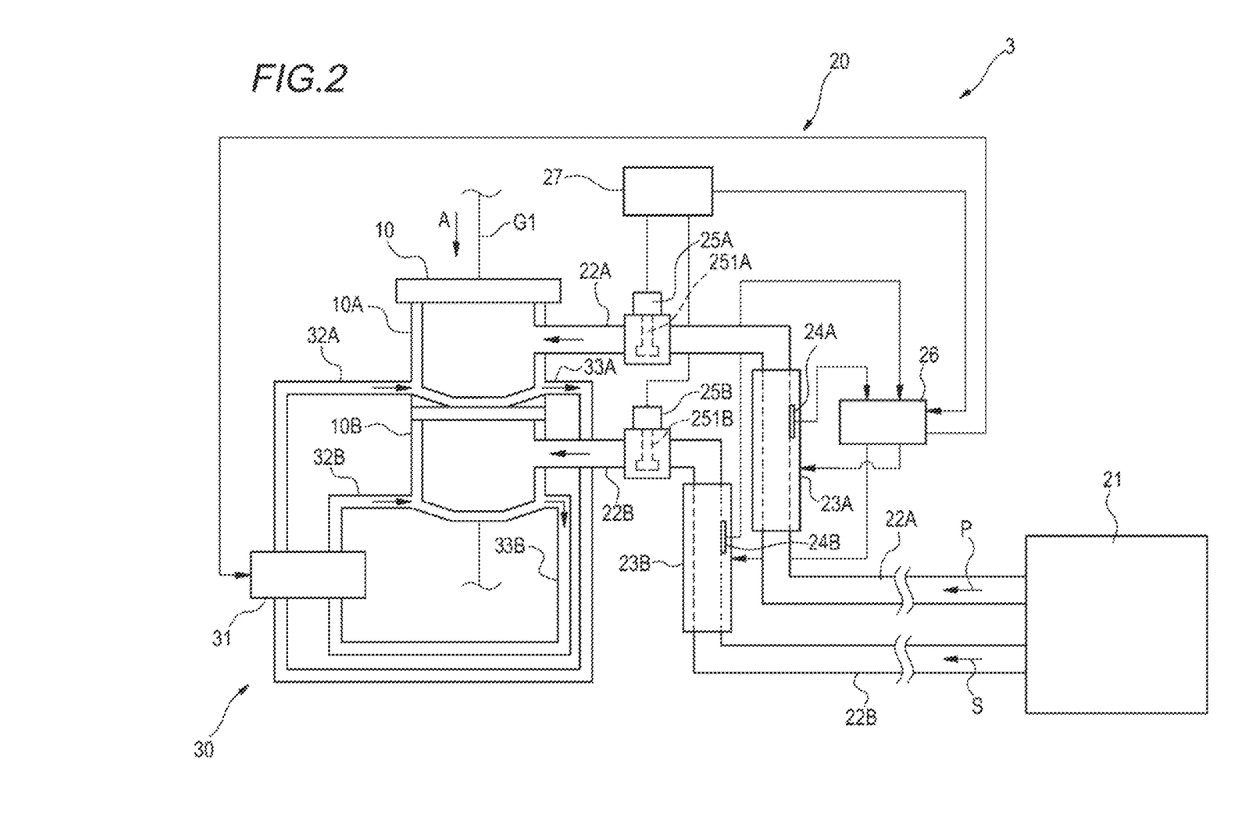
FIG. 2 is a diagram illustrating a resin coating device for the optical fiber of the apparatus illustrated in FIG. 1.

As illustrated in FIG. 2, the resin supply device 20 in the resin coating device for the optical fiber 3 supplies resin from a resin tank 21 to the resin coating portion 10 (the first coating portion 10A and the second coating portion 10B) via a pipe 22 (a first pipe 22A and a second pipe 22B). The first pipe 22A extending from the resin tank 21 is connected to the first coating portion 10A. The second pipe 22B extending from the resin tank 21 is connected to the second coating portion 10B. The resin tank 21 is provided with a first resin tank (not illustrated) that stores the primary resin P and a second resin tank (not illustrated) that stores the secondary resin S. The primary resin P is supplied from the first resin tank to the first coating portion 10A via the first pipe 22A. The secondary resin S is supplied from the second resin tank to the second coating portion 10B via the second pipe 22B.

A first heating portion (for example, a heater) 23A for heating the first pipe 22A is provided around an outer periphery of at least a part of the first pipe 22A. A second heating portion (for example, a heater) 23B for heating the second pipe 22B is provided around an outer periphery of at least a part of the second pipe 22B.

The first pipe 22A is provided with a first temperature measuring portion 24A for measuring a temperature of the primary resin P flowing in the first pipe 22A. The first temperature measuring portion 24A is provided in the first pipe 22A between the first heating portion 23A and the first coating portion 10A. The second pipe 22B is provided with a second temperature measuring portion 24B for measuring a temperature of the secondary resin S flowing in the second pipe 22B. The second temperature measuring portion 24B is provided in the second pipe 22B between the second heating portion 23B and the second coating portion 10B. The first temperature measuring portion 24A and the second temperature measuring portion 24B are, for example, thermometers using a thermocouple.

A first viscometer 25A is further provided in the first pipe 22A between the first temperature measuring portion 24A and the first coating portion 10A. In the first viscometer 25A, a detecting portion 251A contacts the primary resin P in the first pipe 22A, thereby making it possible to continuously measure a viscosity of the primary resin P. A second viscometer 25B is further provided in the second pipe 22B between the second temperature measuring portion 24B and the second coating portion 10B. In the second viscometer 25B, a detecting portion 251B contacts the secondary resin S in the second pipe 22B, thereby making it possible to continuously measure a viscosity of the secondary resin S.

The first viscometer 25A and the second viscometer 25B can use a vibration type viscometer of a rotary vibration type in which the detecting portion 251A and the detecting portion 251B are cylindrical shapes. The detecting portion 251A and the detecting portion 251B may be a vibration type viscometer that vibrates a flat plate by a tuning fork. For example, details of the vibration type viscometer are described in JISZ8803.

The resin supply device 20 is provided with a control portion 26 that controls a heating amount of the first heating portion 23A and the second heating portion 23B. The control portion 26 controls the first heating portion 23A so that the temperature of the primary resin P in the first pipe 22A to be measured by the first temperature measuring portion 24A becomes a target temperature. The control portion 26 controls the second heating portion 23B so that the temperature of the secondary resin S in the second pipe 22B to be measured by the second temperature measuring portion 24 becomes a target temperature.

The resin supply device 20 is provided with an adjusting portion 27 that adjusts a set value of the target temperature of the primary resin P and a set value of the target temperature of the secondary resin S. The adjusting portion 27 compares the viscosity of the primary resin P to be measured by the first viscometer 25A with a target viscosity thereof, and adjusts the set value of the target temperature of the primary resin P so that the viscosity of the primary resin P becomes a first target viscosity. The adjusting portion 27 compares the viscosity of the secondary resin S to be measured by the second viscometer 25B with a target viscosity thereof, and adjusts the set value of the target temperature of the secondary resin S so that the viscosity of the secondary resin S becomes a second target viscosity. The adjusting portion 27 may be configured to be integrated with the control portion 26.

The fluid circulating device 30 includes a temperature adjusting portion 31 that keeps a temperature of the first coating portion 10A and a temperature of the second coating portion 10B at a predetermined temperature. The temperature adjusting portion 31 causes a first fluid having a predetermined temperature set value to flow around a periphery of the first coating portion 10A, thereby keeping the temperature of the first coating portion 10A at the predetermined temperature. The temperature adjusting portion 31 causes a second fluid having a predetermined temperature set value to flow around a periphery of the second coating portion 10B, thereby keeping the temperature of the second coating portion 10B at the predetermined temperature. A first supply pipe 32A to which the first fluid is supplied and a first discharge pipe 33A from which the first fluid is discharged are connected to the first coating portion 10A. A second supply pipe 32B to which the second fluid is supplied and a second discharge pipe 33B from which the second fluid is discharged are connected to the second coating portion 10B. The temperature adjusting portion 31 causes the first fluid to circulate through the first coating portion 10A via the first supply pipe 32A and the first discharge pipe 33A, and causes the second fluid to circulate through the second coating portion 10B via the second supply pipe 32B and the second discharge pipe 33B.

The adjusting portion 27 further adjusts the temperature set value of the first fluid based upon the resin viscosity measured by the first viscometer 25A, and adjusts the temperature set value of the second fluid based upon the viscosity of the secondary resin S measured by the second viscometer 25B. The adjusted temperature set value of the first fluid and the adjusted temperature set value of the second fluid are sent to the temperature adjusting portion 31 via the control portion 26. The temperature adjusting portion 31 adjusts the temperatures of the first fluid and the second fluid as described above to become the respective temperature set values sent therefrom.

Next, the method for manufacturing the optical fiber according to the embodiment of the present disclosure will be described.

The method for manufacturing the optical fiber according to the embodiment includes a resin coating step of supplying the primary resin P and the secondary resin S to the resin coating portion 10 and collectively applying the primary resin P and the secondary resin S to the glass fiber G1. In the resin coating step, the following treatment is performed.

(Resin Coating Step)

The temperature of the primary resin P in the first pipe 22A that supplies the primary resin P to the first coating portion 10A is measured by the first temperature measuring portion 24A. The control portion 26 controls the first heating portion 23A provided around the outer periphery of at least a part of the first pipe 22A so that the temperature of the primary resin P becomes a preset target temperature. The temperature of the secondary resin S in the second pipe 22B that supplies the secondary resin S to the second coating portion 10B is measured by the second temperature measuring portion 24B. The control portion 26 controls the second heating portion 23B provided around the outer periphery of at least a part of the second pipe 22B so that the temperature of the secondary resin S becomes a preset target temperature.

The viscosity of the primary resin P in the first pipe 22A is measured by the first viscometer 25A disposed between the first coating portion 10A and the first heating portion 23A. The adjusting portion 27 adjusts the set value of the target temperature of the primary resin P so that the measured viscosity becomes the first target viscosity. The viscosity of the secondary resin S in the second pipe 22B is measured by the second viscometer 25B disposed between the second coating portion 10B and the second heating portion 23B. The adjusting portion 27 adjusts the set value of the target temperature of the secondary resin S so that the measured viscosity becomes the second target viscosity.

When the glass fiber G1 is coated with the primary resin and the secondary resin, and when a difference between the viscosity of the primary resin of the first coating portion 10A and the viscosity of the secondary resin of the second coating portion 10B is large, the fluctuation of the coating diameter of the optical fiber G2 and the uneven thickness thereof may significantly occur. Therefore, it is desirable to reduce the difference in viscosities between the primary resin and the secondary resin applied to the glass fiber G1. For this reason, it is desirable to cause the first target viscosity and the second target viscosity to match each other.

A change in viscosity until the primary resin P is supplied to the first coating portion 10A from a position where the first viscometer 25A is disposed, and a change in viscosity until the secondary resin S is supplied to the second coating portion 10B from a position where the second viscometer 25B is disposed may be different from each other. Therefore, it is better to set the first target viscosity and the second target viscosity with a predetermined difference without the first target viscosity and the second target viscosity matching each other, such that in some cases, the difference in viscosities between the primary resin and the secondary resin to be actually applied to the glass fiber G1 can be reduced.

The control portion 26 controls the first heating portion 23A so that the temperature of the primary resin P becomes the target temperature of the primary resin P set by the adjusting portion 27. The control portion 26 controls the second heating portion 23B so that the temperature of the secondary resin S becomes the target temperature of the secondary resin S set by the adjusting portion 27.

For example, when the viscosity of the primary resin P in the first pipe 22A measured by the first viscometer 25A is lower than the first target viscosity, the adjusting portion 27 changes a set value of a first target temperature to a set value lower than a set value that has been set so far. Accordingly, the heating amount of the first heating portion 23A is controlled by the control portion 26, and the temperature of the primary resin P becomes the target temperature after the change. As a result, the temperature of the primary resin P supplied into the first coating portion 10A decreases, such that the viscosity of the primary resin P increases as the temperature of the primary resin P decreases. Accordingly, the viscosity of the primary resin P is adjusted to approach the first target viscosity.

Meanwhile, the temperature adjusting portion 31 causes the first fluid whose temperature is adjusted to the predetermined temperature set value to flow around the periphery of the first coating portion 10A, and adjusts the temperature so that the temperature of the first coating portion 10A is kept at the predetermined temperature. The temperature adjusting portion 31 causes the second fluid whose temperature is adjusted to the predetermined temperature set value to flow around the periphery of the second coating portion 10B, and adjusts the temperature so that the temperature of the second coating portion 10B is kept at the predetermined temperature.

Based upon the viscosity of the primary resin P in the first pipe 22A measured by the first viscometer 25A, the temperature set value of the first fluid is adjusted by the adjusting portion 27. Based upon the viscosity of the secondary resin S in the second pipe 22B measured by the second viscometer 25B, the temperature set value of the second fluid is adjusted by the adjusting portion 27.

For example, when the viscosity of the primary resin P in the first pipe 22A measured by the first viscometer 25A is lower than the target viscosity, the temperature set value of the first fluid is changed to a set value lower than a set value that has been set so far. Accordingly, the first fluid whose temperature is adjusted to the low temperature set value is caused to flow around the periphery of the first coating portion 10A, such that the temperature of the first coating portion 10A is kept at a lower temperature than before. As the temperature of the first coating portion 10A decreases, the temperature of the primary resin P supplied into the first coating portion 10A decreases, such that the viscosity of the primary resin P increases as the temperature of the primary resin P decreases. As a result, the viscosity of the primary resin P is adjusted to approach the target viscosity.

Since there is a time lag from changing the set value of the target temperature of the first heating portion 23A (or the second heating portion 23B) until stabilizing the viscosity of the primary resin P (or the secondary resin S), the set value of the target temperature may be changed at an interval. For example, the interval may be set every 5 minutes. When an amount of the resin (the primary resin P and the secondary resin S) flowing in the pipe 22 (the first pipe 22A and the second pipe 22B) is large due to a high speed of drawing, the set value of the target temperature may be changed in a shorter cycle. With respect to a change amount of the set value of the target temperature per once, a relationship between the viscosity of the resin (the primary resin P and the secondary resin S) and the temperature thereof is grasped in advance, after which the change amount thereof may be set to an appropriate change amount according to a difference between the target viscosity (the first target viscosity and the second target viscosity) and the measured viscosity. Here, the change amount per one time may be set to a constant small value, and the set value of the target temperature may be changed to match the target viscosity (the first target viscosity and the second target viscosity) by several changes.

According to the method for manufacturing the optical fiber and the an apparatus of manufacturing the optical fiber 1 according to the embodiment, since the resin temperature in the pipe 22 (22A and 22B) is measured and the heating portion 23 (23A and 23B) is controlled so that the resin temperature becomes the set target temperature, the resin temperature can be controlled with good followability with respect to the fluctuation of the resin temperature.

For example, even though the same type of resin is used, a variation in a viscosity-temperature characteristic may occur for each production lot. Therefore, even though the resin temperature is controlled to become the preset target temperature, an actual resin viscosity may deviate from the target viscosity. On the other hand, according to the method for manufacturing the optical fiber and the apparatus of manufacturing the optical fiber 1 according to the embodiment, the resin viscosity is measured during drawing, and the set value of the target temperature of the resin is adjusted so that the resin viscosity becomes the target viscosity. The resin viscosity is measured in the pipe 22 (22A and 22B) between the resin coating portion 10 (10A and 10B) and the temperature measuring portion 24 (24A and 24B), whereby a resin viscosity at a portion closer to the resin coating portion 10 (10A and 10B) can be controlled to the target viscosity. Therefore, the viscosity of the resin applied during the drawing operation can be sufficiently close to the target viscosity, and the viscosity fluctuation of the resin applied during drawing is prevented, thereby making it possible to prevent the fluctuation of the coating diameter of the optical fiber G2 and the uneven thickness thereof from occurring.

The temperature of the fluid to be circulated around the periphery of the resin coating portion 10 is adjusted and the temperature of the resin coating portion 10 is adjusted based upon the measured resin viscosity, whereby it is possible to perform adjustment for keeping the temperature of the resin, immediately before being applied to the glass fiber G1, at the target temperature. Accordingly, it is possible to more surely prevent the fluctuation of the coating diameter of the optical fiber G2 and the uneven thickness thereof from occurring.

The resin coating portion 10 is configured with the first coating portion 10A and the second coating portion 10B. Therefore, even when the glass fiber G1 is coated with two layers of resin, the resin temperature can be controlled for different target temperatures of the primary resin P and the secondary resin S. The resin viscosities of the primary resin P and the secondary resin S are respectively measured, and the set value of the target temperature is adjusted to become the respective target viscosities (the first target viscosity and the second target viscosity). Therefore, even when the temperature characteristic with respect to the viscosity is different between the primary resin P and the secondary resin S, it is possible to reduce the difference in viscosities between the two resins applied during drawing. As a result, it is possible to prevent the fluctuation of the coating diameter of the optical fiber G2 and the uneven thickness thereof from occurring.

By causing the first target viscosity and the second target viscosity to match each other and respectively adjusting the set values of the target temperatures, the difference in viscosities between the two resins applied during drawing can be more surely reduced. Accordingly, it is possible to more surely reduce a defect rate caused by the occurrence of the fluctuation of the coating diameter of the optical fiber G2 and the uneven thickness thereof.

Since the vibration type viscometer is used, a rod-shaped vibration sensor inserted into the pipe can measure the viscosity of the fluid by contacting the fluid, thereby being suitable for measuring the viscosity of the fluid. The vibration type viscometer has a feature of obtaining a quick response and performing continuous measurement.

Hereinafter, an example and a comparative example will be described.

In the example and the comparative example, the first target viscosity of the primary resin P is set to 2.0 Pa·s and the first target temperature thereof is set to 45.0° C. The second target viscosity of the secondary resin S is set to 2.0 Pa·s and the first target temperature thereof is set to 35.0° C.

Example

In the example, by the method for manufacturing the optical fiber according to the embodiment using the apparatus of manufacturing the optical fiber 1, the optical fiber G2 in which the glass fiber G1 is coated with the primary resin P and the secondary resin S is produced by using the temperature measuring portion 24 (the first temperature measuring portion 24A and the second temperature measuring portion 24B) and the viscometer 25 (the first viscometer 25A and the second viscometer 25B). The production is performed by adjusting the set value of the target temperature so that the viscosity of the primary resin P measured by the first viscometer 25A becomes the first target viscosity of 2.0 Pa·s and by adjusting the set value of the target temperature so that the viscosity of the secondary resin S measured by the second viscometer 25B becomes the second target viscosity of 2.0 Pa·s.

With respect to the optical fiber G2 produced for one month, an uneven thickness defect rate caused by the fluctuation of the coating diameter and the uneven thickness thereof is measured. The uneven thickness defect rate is defined by (a fiber length discarded due to uneven thickness adjustment or uneven thickness defect)/(a drawing input length)×100[%].

The uneven thickness defect rate measured in the above-described example is 0.20%.

Comparative Example

In the comparative example, the optical fiber G2 in which the glass fiber G1 is coated with the primary resin P and the secondary resin S is produced by using the apparatus of manufacturing the optical fiber 1 without using the viscometer 25 (the first viscometer 25A and the second viscometer 25B), and by keeping the target temperature of the heating portion 23 (the first heating portion 23A and the second heating portion 23B) provided around the outer periphery of the pipe 22 (the first pipe 22A and the second pipe 22B) constant at the first target temperature.

With respect to the optical fiber G2 produced for one month, the uneven thickness defect rate caused by the fluctuation of the coating diameter and the uneven thickness thereof is measured.

The uneven thickness defect rate measured in the above-described comparative example is 0.40%.

As described above, the uneven thickness defect rate of the optical fiber in the example is lower than that in the comparative example. That is, the optical fiber G2 is manufactured by using the apparatus of manufacturing the optical fiber 1 and the method thereof according to the embodiment of the present disclosure, thereby making it possible to prevent the fluctuation of the coating diameter of the optical fiber of the optical fiber G2 to be manufactured and the uneven thickness thereof from occurring.

As described above, while the present invention is described in detail or with reference to a particular embodiment, it is apparent to those skilled in the art that various changes and modifications can be made without departing from the spirit and scope of the present invention. The number, position, and shape of the above-described components are not limited to the embodiment, and the number, position, and shape thereof can be suitably changed for performing the present invention.

REFERENCE SIGNS LIST

1: apparatus of manufacturing optical fiber
3: resin coating device for optical fiber
10: resin coating portion
10A: first coating portion
10B: second coating portion
20: resin supply device
30: fluid circulating device
22A: first pipe
22B: second pipe
23A: first heating portion
23B: second heating portion
24A: first temperature measuring portion
24B: second temperature measuring portion
25A: first viscometer
251A: detecting portion
25B: second viscometer
251B: detecting portion
26: control portion
27: adjusting portion
31: temperature adjusting portion
G: optical fiber preform
G1: glass fiber
G2: optical fiber

The invention claimed is:

1. A method for manufacturing an optical fiber, the method comprising:
a resin coating step, comprising:
supplying resin to a resin coating portion via a pipe;
causing a glass fiber to pass through the resin coating portion;
coating an outer periphery of the glass fiber with the resin;
controlling a heating portion provided around an outer periphery of at least a part of the pipe so that a resin temperature in the pipe becomes a set target temperature with measuring the resin temperature in the pipe; and
adjusting a set value of the target temperature so that a resin viscosity measured by a viscometer becomes a target viscosity, the viscometer being disposed between the resin coating portion and the heating portion,
wherein the viscometer includes a vibration type viscometer configured to measure viscosity of fluid by contact of a rod-shaped vibration sensor inserted into the pipe with the fluid, and
wherein the set value of the target temperature is changed at an interval.

2. The method for manufacturing the optical fiber according to claim 1, further comprising:
keeping the resin coating portion at a predetermined temperature by allowing a fluid having a predetermined temperature set value to flow around a periphery of the resin coating portion; and
adjusting the temperature set value of the fluid based upon the resin viscosity measured by the viscometer.

3. The method for manufacturing the optical fiber according to claim 1,
wherein the resin coating portion is configured by integrally assembling a first coating portion coating an outside of the glass fiber with first resin and a second coating portion coating an outside of the first resin with second resin, and
wherein in the resin coating step, the method further comprises:
measuring a resin temperature in a first pipe supplying the first resin to the first coating portion;
measuring a resin temperature in a second pipe supplying the second resin to the second coating portion;
controlling each heating portion so that the resin temperature in the first pipe and the resin temperature in the second pipe become the set target temperature;
adjusting a set value of the target temperature in the first pipe so that a viscosity of the first resin measured by a first viscometer becomes a first target viscosity, the first viscometer being disposed between the first coating portion and the first pipe; and
adjusting a set value of the target temperature in the second pipe so that a viscosity of the second resin measured by a second viscometer becomes a second target viscosity, the second viscometer being disposed between the second coating portion and the second pipe.

4. The method for manufacturing the optical fiber according to claim 3,
wherein the resin coating step comprises:
causing the first target viscosity and the second target viscosity to match each other; and
adjusting the set value of the target temperature in the first pipe and the set value of the target temperature in the second pipe.

5. An apparatus of manufacturing an optical fiber, comprising:
a resin coating portion coating an outer periphery of a glass fiber with a resin by supplying the resin via a pipe and passing the glass fiber through the resin coating portion;
a heating portion heating an outer periphery of at least a part of the pipe;
a temperature measuring portion measuring a resin temperature in the pipe;
a controller connected to the heating portion and configured to control the heating portion so that the resin temperature in the pipe becomes a target temperature;
a viscometer disposed between the resin coating portion and the heating portion; and
an adjusting portion configured to adjust a set value of the target temperature so that a resin viscosity measured by the viscometer becomes a target viscosity,
wherein the viscometer includes a vibration type viscometer configured to measure viscosity of fluid by contact of a rod-shaped vibration sensor inserted into the pipe with the fluid, and
wherein the set value of the target temperature is changed at an interval.

6. The apparatus of manufacturing the optical fiber according to claim 5, further comprising:
a temperature adjusting portion configured to keep a temperature of the resin coating portion at a predetermined temperature by allowing a fluid having a predetermined temperature set value to flow around a periphery of the resin coating portion,
wherein the temperature adjusting portion is further configured to adjust the temperature set value of the fluid based on the resin viscosity measured by the viscometer.

* * * * *